US012639228B2

(12) United States Patent
Brewer et al.

(10) Patent No.: US 12,639,228 B2
(45) Date of Patent: *May 26, 2026

(54) SILENT CACHE LINE EVICTION

(71) Applicant: Micron Technology, Inc., Boise, ID (US)

(72) Inventors: Tony M. Brewer, Plano, TX (US); Dean E. Walker, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/887,810

(22) Filed: Sep. 17, 2024

(65) Prior Publication Data

US 2025/0013575 A1     Jan. 9, 2025

Related U.S. Application Data

(63) Continuation of application No. 17/823,408, filed on Aug. 30, 2022, now Pat. No. 12,111,770.

(51) Int. Cl.
*G06F 12/0891*     (2016.01)
*G06F 9/38*     (2018.01)

(52) U.S. Cl.
CPC ........ *G06F 12/0891* (2013.01); *G06F 9/3816* (2013.01); *G06F 2212/7209* (2013.01)

(58) Field of Classification Search
CPC .... G06F 12/0891; G06F 9/3816; G06F 12/12; G06F 12/121; G06F 12/126; G06F 12/127; G06F 2212/7209; G06F 12/084; G06F 12/0877
See application file for complete search history.

(56) References Cited

U.S. PATENT DOCUMENTS

| | | | |
|---|---|---|---|
| 5,860,105 A | 1/1999 | Mcdermott et al. | |
| 5,924,121 A | 7/1999 | Arimilli et al. | |
| 6,185,658 B1 | 2/2001 | Arimilli et al. | |
| 7,752,180 B1 | 7/2010 | Fair et al. | |

(Continued)

FOREIGN PATENT DOCUMENTS

WO     WO-2007041392 A2     4/2007

OTHER PUBLICATIONS

Blankenship, Robert, "Compute Express Link™ (CXL™): Memory and Cache Protocols", Storage Developer Conference, [Online] Retrieved from the internet: <https://snia.org/sites/default/files/SDC/2020/130-Blankenship-CXL-1.1-Protocol-Extensions.pdf>, (Sep. 23, 2020).

*Primary Examiner* — Michael Krofcheck
(74) *Attorney, Agent, or Firm* — Schwegman Lundberg & Woessner, P.A.

(57)     ABSTRACT

System and techniques for silent cache line eviction are described herein. A memory device receives a memory operation from a host. The memory operation establishes data and metadata in a cache line of the memory device upon receipt. The metadata is stored in a memory element that corresponds to the cache line. Later, an eviction trigger to evict the cache line is identified. Then, in response to the eviction trigger, current metadata of the cache line is compared with the metadata in the memory element to determine whether the metadata has changed. the cache line can be evicted without writing to backing memory in response to the metadata being unchanged.

20 Claims, 7 Drawing Sheets

(56)                    References Cited

U.S. PATENT DOCUMENTS

2006/0184745  A1      8/2006  Tan
2020/0192800  A1 *    6/2020  Biles ................... G06F 12/0815
2023/0401311  A1     12/2023  Erickson et al.
2024/0070083  A1      2/2024  Brewer et al.

* cited by examiner

400

| | CACHE LINE | WAY 0 TAG + DATA | 425 |
|---|---|---|---|
| CACHE SET 0 (ADDRESS 00XXXX) 405 | CACHE LINE | WAY 1 TAG + DATA | 430 |
| | CACHE LINE | WAY 2 TAG + DATA | 435 |
| | CACHE LINE | WAY 3 TAG + DATA | 440 |
| | CACHE LINE | WAY 0 TAG + DATA | |
| CACHE SET 1 (ADDRESS 01XXXX) 410 | CACHE LINE | WAY 1 TAG + DATA | |
| | CACHE LINE | WAY 2 TAG + DATA | |
| | CACHE LINE | WAY 3 TAG + DATA | |
| | CACHE LINE | WAY 0 TAG + DATA | |
| CACHE SET 2 (ADDRESS 10XXXX) 415 | CACHE LINE | WAY 1 TAG + DATA | |
| | CACHE LINE | WAY 2 TAG + DATA | |
| | CACHE LINE | WAY 3 TAG + DATA | |
| | CACHE LINE | WAY 0 TAG + DATA | |
| CACHE SET 3 (ADDRESS 11XXXX) 420 | CACHE LINE | WAY 1 TAG + DATA | |
| | CACHE LINE | WAY 2 TAG + DATA | |
| | CACHE LINE | WAY 3 TAG + DATA | |

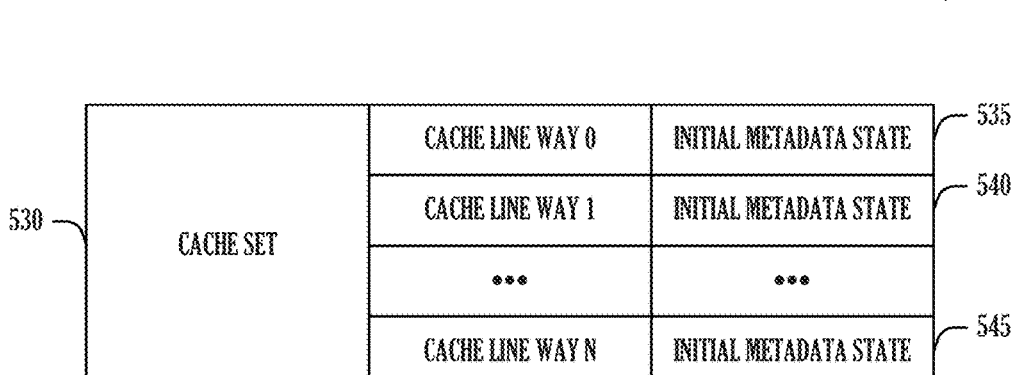

| | | |
|---|---|---|
| 530 | CACHE LINE WAY 0 | INITIAL METADATA STATE | —535 |
| CACHE SET | CACHE LINE WAY 1 | INITIAL METADATA STATE | —540 |
| | ••• | ••• | |
| | CACHE LINE WAY N | INITIAL METADATA STATE | —545 |

—550

WRITE CACHE WAY          UPDATE METADATA          UPDATE METADATA          EVICT CACHE WAY

555 — WRITE METADATA

560 — WRITE METADATA INTO MEMORY ELEMENT FOR WAY

565 — RECEIVE METADATA UPDATE

570 — WRITE METADATA UPDATE

575 — RECEIVE METADATA UPDATE

580 — WRITE METADATA UPDATE

585 — COMPARE METADATA TO MEMORY ELEMENT

590 — REFRAIN FROM WRITEBACK BASED ON COMPARISON

FIG. 5

605 — RECEIVE MEMORY OPERATION

610 — WRITE METADATA FOR MEMORY OPERATION IN MEMORY ELEMENT OF CACHE LINE

615 — IDENTIFY EVICTION TRIGGER FOR CACHE LINE

620 — DETERMINE THAT METADATA HAS NOT CHANGED BY COMPARING CONTENTS OF MEMORY ELEMENT WITH CACHE LINE METADATA

625 — EVICT CACHE LINE WITHOUT A MEMORY WRITE BACK BASED ON THE METADATA BEING UNCHANGED

SILENT CACHE LINE EVICTION

PRIORITY APPLICATION

This application is a continuation of U.S. application Ser. No. 17/823,408, filed Aug. 30, 2022, which is incorporated herein by reference in its entirety.

STATEMENT REGARDING GOVERNMENT SUPPORT

This invention was made with Government support under Agreement No. DE-NA0003525, awarded by SANDIA II. The Government has certain rights in the invention.

TECHNICAL FIELD

Embodiments described herein generally relate to computer memory and more specifically to silent cache line eviction.

BACKGROUND

Memory devices for computers or other electronic devices can be categorized as volatile and non-volatile memory. Volatile memory uses power to maintain its data (e.g., is periodically refreshed), and includes random-access memory (RAM), dynamic random-access memory (DRAM), or synchronous dynamic random-access memory (SDRAM), among others. Non-volatile memory generally retains stored data in the absence of a power source, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In an example, non-volatile memory media can be used to build a system with a persistent memory model.

Memory devices can be coupled to a host (e.g., a host computing device) to store data, commands, or instructions for use by the host while the computer or electronic system is operating. For example, data, commands, or instructions can be transferred between the host and the memory device during operation of a computing or other electronic system.

Various protocols or standards can be applied to facilitate communication between a host and one or more other devices such as memory buffers, accelerators, or other input/output devices. In an example, an unordered protocol, such as Compute Express Link (CXL), can be used to provide high-bandwidth and low-latency connectivity.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 4 illustrates an example of an associative cache, according to an embodiment.

FIG. 5 illustrates an example of cache meta state transformation without writeback, according to an embodiment.

DETAILED DESCRIPTION

Figure 1:
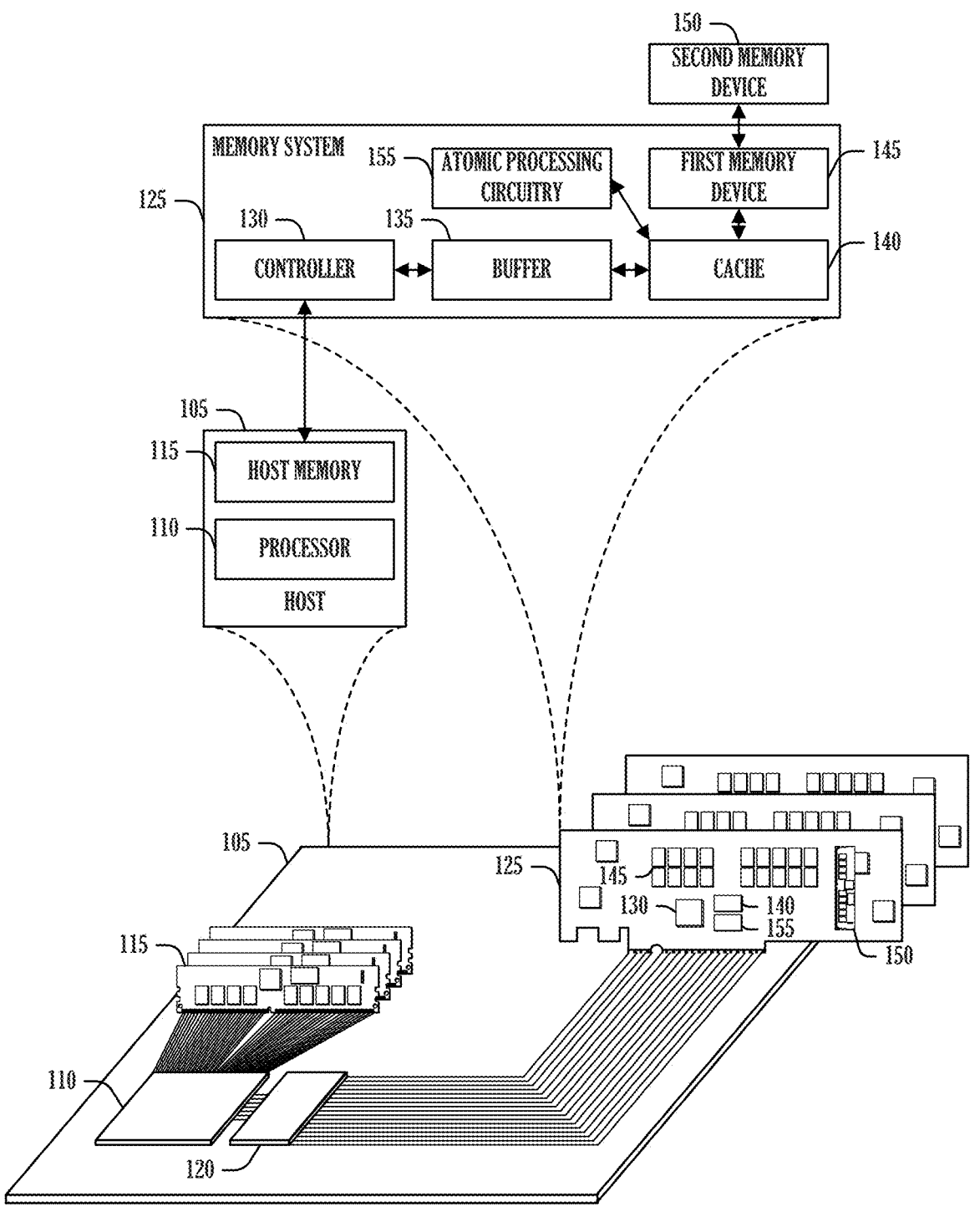
FIG. 1 illustrates an example of an environment including a system for silent cache line eviction, according to an embodiment.

Compute Express Link (CXL) is an open standard interconnect configured for high-bandwidth, low-latency connectivity between host devices and other devices such as accelerators, memory buffers, or smart input-output (I/O) devices. CXL was designed to facilitate high-performance computational workloads by supporting heterogeneous processing and memory systems. CXL provides memory semantics and mechanisms for cache coherency on top of PCI Express (PCIe)-based I/O semantics for optimized performance.

CXL can be used in applications such as artificial intelligence, machine learning, analytics, cloud infrastructure, edge computing devices, communication systems, and elsewhere, to provide flexible connectivity to memory or accelerators for a host processor platform. Data processing in such applications can use various scalar, vector, matrix, or spatial architectures that can be deployed in CPU, GPU, FPGA, smart NICs, or other accelerators that can be coupled using a CXL link. Near memory accelerators, in which an accelerator is collocated with memory, provide low latency processing while expanding system capabilities.

CXL supports dynamic multiplexing using a set of protocols that includes I/O (CXL.io, based on PCIe), caching (CXL.cache), and memory (CXL.memory) semantics. In an example, CXL can be used to maintain a unified, coherent memory space (e.g., cache coherence) between the CPU (e.g., a host device or host processor) and any memory managed (e.g., at) the CXL device. This configuration enables the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL devices that include both memory and an accelerator can be termed "CXL type-2" devices. Although the accelerators of such devices can be used by themselves through the CXL interface, often these accelerators provide near-memory compute to reduce round-trip latency to a host processor. In accordance with current CXL standards, CLX memory requests (e.g., external requests) take priority over other requests, such as network-on-chip (NOC) or other internal requests. This priority requires CXL memory requests to make forward progress independent of any other device activity, such as activity by an accelerator. That is, a CXL memory request cannot block indefinitely waiting for a non-CXL memory request to complete. Separately managing memory controller workflow with this restriction when both CXL and non-CXL requests are being made can be a complex process.

To address the complexity between CXL (or other external) requests and accelerator (or other internal requests), separate processing queues are maintained for deferred requests. Requests that are not deferred proceed as soon as they arrive in the memory controller because there is no resource contention. Thus, in these cases, there is no opportunity, for example, for an internal request to block the progress of an external request. However, when resource contention is present, the request will be deferred until the contention is resolved. An elegant solution to managing the different processing priorities of external and internal requests includes queuing each in separate deferral queues, whereby priority of the external requests can be easily maintained by prioritizing extraction of requests from the external queue. Moreover, order of operations on a memory address can be maintained by judicious selection of requests from the external and internal queues all while preventing an internal request from blocking (e.g., preventing forward progress on) an external request.

CXL coherency mechanisms provide control semantics for cache elements in CXL and host devices. One such mechanism is the use of CXL meta state. The CXL meta state is a data structure set by the host that informs attached devices of the current status of various elements of the CXL connection. One such aspect of the meta state includes which entity—for example the host or the memory device—has control over a cache line. In general, a CXL memory device can save CXL meta state associated with the CXL standard in memory per memory line to improve host processor cache coherency performance. Reading or writing the meta state can, at times, lead to significant overhead. For example, naïve implementations can result in consuming unnecessary memory bandwidth.

A cache line is often marked as dirty when a write is performed. In this circumstance, the term "dirty" indicates that there is an inconsistency between the data in the cache line and the corresponding memory line in the backing memory. To "clean" the cache line, the data is written back to the memory line to make these two data locations consistent. Accordingly, if the data (e.g., cache line) is dirty when the line is evicted from the cache, then the data is written back to memory. Naïve implementations of meta state handling are generally handled the same as the data, wherein a dirty bit or other indication is used to track when the meta state changes between writes to the memory. This, however, can result in unnecessary meta state writes to memory when, for example, the meta state reverts to the in-memory value before an eviction event occurs.

To address unnecessary meta state writes to the backing memory from the cache, an original (e.g., memory consistent) version of the memory state is tracked separately from a current meta state. The current meta state represents the last change in the meta state. When an eviction event occurs, the original meta state is compared to the current meta state. If they are the same, then the meta state does not provoke a memory writeback for the cache line. In an example, if the data is marked dirty, the comparison does not occur and the writeback happens regardless of the difference or sameness in the original and the current meta states because a writeback will happen simply to make the data consistent. However, if the data is not dirty (e.g., only a read occurred to set the cache line) and the original meta state is equivalent to the current meta state, then the cache line can be evicted with no writeback to the backing memory. This circumstance can greatly reduce unnecessary writebacks, reducing memory bandwidth and power consumption, and thus increasing overall system performance, over other meta state implementations. Additional details and examples are provided below.

FIG. 1 illustrates an example of an environment including a system for silent cache line eviction, according to an embodiment. The system includes a host device 105 and a memory system 125. The host device 105 includes processor 110 (e.g., a central processing unit (CPU)) and host memory 115. In an example, the host device 105 is, or is part of, a host system such as a server computer, workstation, personal laptop computer, a desktop computer, a digital camera, a smart phone, a memory card reader, or Internet-of-thing enabled device, among others. The processor 110 can include one or more processor cores, a system of parallel processors, or other CPU arrangements.

The memory system 125 includes a controller 130, a buffer 135 (e.g., internal state memory), a cache 140, and a first memory device 145. The first memory device 145 can include, for example, one or more memory modules (e.g., single in-line memory modules, dual in-line memory modules, etc.). The first memory device 145 can include volatile memory or non-volatile memory. The first memory device 145 can include a multiple-chip device that comprises one or multiple different memory types or modules. In an example, the system includes a second memory device 150 that interfaces with the memory system 125 and the host device 105.

The host device 105 can include a system backplane and can include a number of processing resources (e.g., one or more processors, microprocessors, or some other type of controlling circuitry). The system can optionally include separate integrated circuits for the host device 105, the memory system 125, the controller 130, the buffer 135, the cache 140, the first memory device 145, the second memory device 150, any one or more of which can comprise respective chiplets that can be connected and used together. In an example, the system includes a server system or a high-performance computing (HPC) system or a portion thereof. Embodiments of the host device 105 can be implemented in Von Neumann or in non-Von Neumann architectures, which can include one or more components (e.g., CPU, ALU, etc.) often associated with a Von Neumann architecture, or can omit these components.

In an example, the first memory device 145 can provide a main memory for the system, or the first memory device 145 can comprise accessory memory or storage for use by the system. In an example, the first memory device 145 or the second memory device 150 includes one or more arrays of memory cells, e.g., volatile or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 145 includes persistent or non-volatile memory, the first memory device 145 can include a flash memory device such as a NAND or NOR flash memory device. The first memory device 145 can include other non-volatile memory devices such as non-volatile random-access memory devices (e.g., NVRAM, ReRAM, FeRAM, MRAM, PCM). Some memory devices—such as a ferroelectric RAM (FeRAM) devices that include ferroelectric capacitors—can exhibit hysteresis characteristics, such as a 3-D Crosspoint (3D XP) memory device, or combinations thereof.

In an example, the interface 120 can include any type of communication path, bus, interconnect, or the like, that enables information to be transferred between the processor 110, or other devices of the host device 105, and the memory system 125. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, or a miniature serial advanced technology attachment (mSATA) interface, among others. In an example, the interface 120 includes a PCIe 5.0 interface that is compliant with the compute express link (CXL) protocol standard. Accordingly, in some embodiments, the interface 120 supports transfer speeds of at least 32 GT/s.

CXL is a high-speed central processing unit (CPU)-to-device and CPU-to-memory interconnect designed to enhance compute performance. CXL maintains memory coherency between the CPU memory space (e.g., the host memory 115 or caches maintained by the processor 110) and memory on attached devices or accelerators (e.g., the first memory device 145 or the second memory device 150). This arrangement enables resource sharing at higher performance, reduced software stack complexity, and lower overall system cost than other interconnect arrangements. CXL is an industry open standard interface for high-speed communications to accelerators that are increasingly used to complement CPUs in support of emerging data-rich and compute-intensive applications such as artificial intelligence and machine learning. The memory system 125 is illustrated with atomic processing circuitry 155 as an accelerator in order to perform near-memory operations. In general, the atomic memory operations (AMOs) performed by the atomic processing circuitry 155 include such small operations as incrementing a number at a memory address or multiply number in two memory addresses, etc. While AMOs are generally used for such operations, the manipulation of memory is not so restricted. For example, modern artificial neural network architectures generally involves the application of small additive or multiplicative operations or thresholding across vast swaths of artificial neurons. Because the computations are usually simple, but the data large, near memory execution of such operations is possible and beneficial given the illustrated architecture.

In an example, the controller 130 comprises a media controller such as a non-volatile memory express (NVMe) controller. The controller 130 can be configured to perform operations such as copy, write, read, error correct, etc. for the first memory device 145. In an example, the controller 130 can include purpose-built circuitry or instructions to perform various operations. That is, in some embodiments, the controller 130 can include circuitry or can be configured to perform instructions to control movement of data or addresses associated with data such as among the buffer 135, the cache 140, or the first memory device 145 or the second memory device 150.

In an example, at least one of the processor 110 or the controller 130 comprises a command manager (CM) for the memory system 125. The CM can receive, such as from the host device 105, a read command for a particular logic row address in the first memory device 145 or the second memory device 150. In an example, the CM can determine that the logical row address is associated with a first row based at least in part on a pointer stored in a register of the controller 130. In an example, the CM can receive, from the host device 105, a write command for a logical row address, and the write command can be associated with second data.

In an example, the CM can be configured to issue, to non-volatile memory and between issuing the read command and the write command, an access command associated with the first memory device 145 or the second memory device 150. In an example, the CM can issue, to the non-volatile memory and between issuing the read command and the write command, an access command associated with the first memory device 145 or the second memory device 150.

In an example, the buffer 135 comprises a data buffer circuit that includes a region of a physical memory used to temporarily store data, for example, while the data is moved from one place to another. The buffer 135 can include a first-in, first-out (FIFO) queue in which the oldest (e.g., the first-in) data is processed first. In some embodiments, the buffer 135 includes a hardware shift register, a circular buffer, or a list.

In an example, the cache 140 comprises a region of a physical memory used to temporarily store particular data from the first memory device 145 or the second memory device 150. Generally, the cache provides faster access to data than the backing memories. The cache 140 can include a pool of data entries. In an example, the cache 140 can be configured to operate according to a write-back policy in which data is written to the cache without the being concurrently written to the first memory device 145. Accordingly, in some embodiments, data written to the cache 140 does not have a corresponding data entry in the first memory device 145. This can occur when, for example, data is written to the cache and deleted before a write-back is triggered to write the data into the first memory device 145, for example.

In an example, the cache 140 is implemented as a multi-way associative cache. Here, cache entries are divided by some portion of a memory address (e.g., a set number of significant bits). A group of cache entries (e.g., cache lines or ways), called a cache set herein, can be co-associated with a same bit-set from the memory address. Usually, the number of ways in a cache set is less than the total number of memory addresses to which the ways are associated. Thus, a way can be evicted to be associated with a new memory address in the range at various points. FIG. 4 illustrates some elements of this type of associative cache.

In an example, the controller 130 can receive write requests involving the cache 140 and cause data associated with each of the write requests to be written to the cache 140. The controller 130 can similarly receive read requests and cause data that is stored in, for example, the first memory device 145 or the second memory device 150, to be retrieved and written to, for example, the host device 105 via the interface 120. In an example, the controller 130 processes all requests for memory it controls through the cache 140. Thus, a read request will first check the cache 140 to determine if the data is already cached. If not, a read to the first memory device 145 is made to retrieve the data. The data is then written to the cache 140. In an example, the data is then read from the cache 140 and transmitted to the processor 110. Working exclusively through the cache can simplify some elements of the controller 130 hardware at the cost of a little latency.

The following configuration are described from the perspective of the controller 130 for the sake of simplicity. However, the cache 140 can include circuitry to perform some or all of these operations. The efficiencies gained by avoiding unnecessary write backs from the cache 140 to backing memory, such as the first memory device 145, can be achieved by tracking both a current meta stat of a cache line and an original meta state of the cache line. The original meta state representing the meta state already stored in the backing memory. If the cache line is evicted, and the two versions of the meta state match—at least match enough based on a threshold—then it can be assumed that the first memory device 145 already has an appropriate version of the current meta state and no write is needed to make the first memory device 145 consistent with the meta state in the cache 140. Thus, this write can be avoided.

To implement the above, the controller 130 is configured to receive a memory operation, for example, from the host processor 110. In an example, the memory operation establishes (e.g., includes, defines, indicates, etc.) data and metadata in a cache line (e.g., way) of the memory system 125. The establishment either comes from the request—as can be the case with a write memory request—or from the backing memory in a read. Generally, when the cache line data and metadata are supplied by the request, there will be a need to write the line to the backing memory because the data dirty indication will be set. In this circumstance, the cache line will likely be written to the backing memory to save the data and so the metadata will be written as part of that write. However, situations can arise in which the write is undone prior to the cache line being evicted. Here, there may be no need to perform the write-back based on the data itself. In an example, the metadata is connection metadata of the interface 120 between the host processor 110 and the memory system 125. In an example, where the interface is a CXL interlink, the metadata is CXL meta-state.

The controller 130 is configured to store the metadata in a memory element that corresponds to the cache line. This storage of the metadata is also referred to as the "original" metadata because the stored metadata is immutable until the cache line is evicted. As explained below, this original metadata provides the basis by which current metadata is judged to determine whether a write to the backing memory will be performed based on metadata. The current metadata—as changed through various interactions with the host processor 110 for example—is maintained by the cache 140, for example, in the tag data (e.g., as illustrated in FIG. 4) of the cache line. In an example, the cache 140 includes an additional structure, such as a register, for each cache line to maintain the metadata.

The controller 130 is configured to identify an eviction trigger to evict the cache line. Such a trigger can include a need for a new memory line to be loaded to the cache line to make forward progress on pending requests, expiration of a time period, a command from the host processor 110, or other condition that would normally result in the cache line being made consistent with the backing memory. Once the eviction trigger is identified, the controller 130 is configured to compare the current metadata of the cache line to the original metadata in the memory element. As noted, before, the comparison measures whether, and to what degree, the metadata has changed. If there is no change, there is no purpose in writing the metadata data to the backing memory. However, as the cache line tag data is written as part of a cache line data write, there is no reason to avoid writing the metadata when the cache line data will be written. Accordingly, in an example, to compare the current metadata of the cache line with the metadata in the memory element, the controller 130 is configured to determining a state of the dirty flag for the cache line. In an example, the dirty flag is checked first and, if marked clean, then the comparison of the original metadata and the current metadata proceeds. This reduces the number of operations when the eviction will result in a write anyway.

The comparison between the original and the current metadata can be performed bit-wise, value-wise, field-wise, etc. In an example, the comparison results in a determination that corresponding elements of interest between the two meta data are within a predefined threshold from each other. Thus, if a timestamp is within a millisecond, it can be equivalent under the threshold. Some fields can be avoided altogether for comparison. For example, if there is diagnostic information that is important for a given time period, but it is generally irrelevant, such information can be omitted from the fields or data compared.

The purposed of comparing the original metadata and the current metadata arises when multiple changes to the metadata are made. There are multiple for a comparison to be necessary as any one change can be encompassed by a dirty flag for the metadata. Accordingly, the controller 130 is configured to receive multiple updates to the metadata—each update replacing the previous update as the value of the current metadata—of the cache line between receipt of the memory operation and the eviction trigger.

When the comparison of the original and the current metadata results in equivalency, then the cache line is evicted without writing to the backing memory. This is sometimes called a silent eviction because the data of the cache line is simply overwritten. In an example, the cache line is evicted without writing to the backing memory in response to the dirty flag being unset. Here, as noted above, the cache line data is clean (e.g., the same as in the backing memory). Were the data dirty, a write to the backing memory would likely occur without regard to the result of comparing the original and the current metadata.

Figure 2:
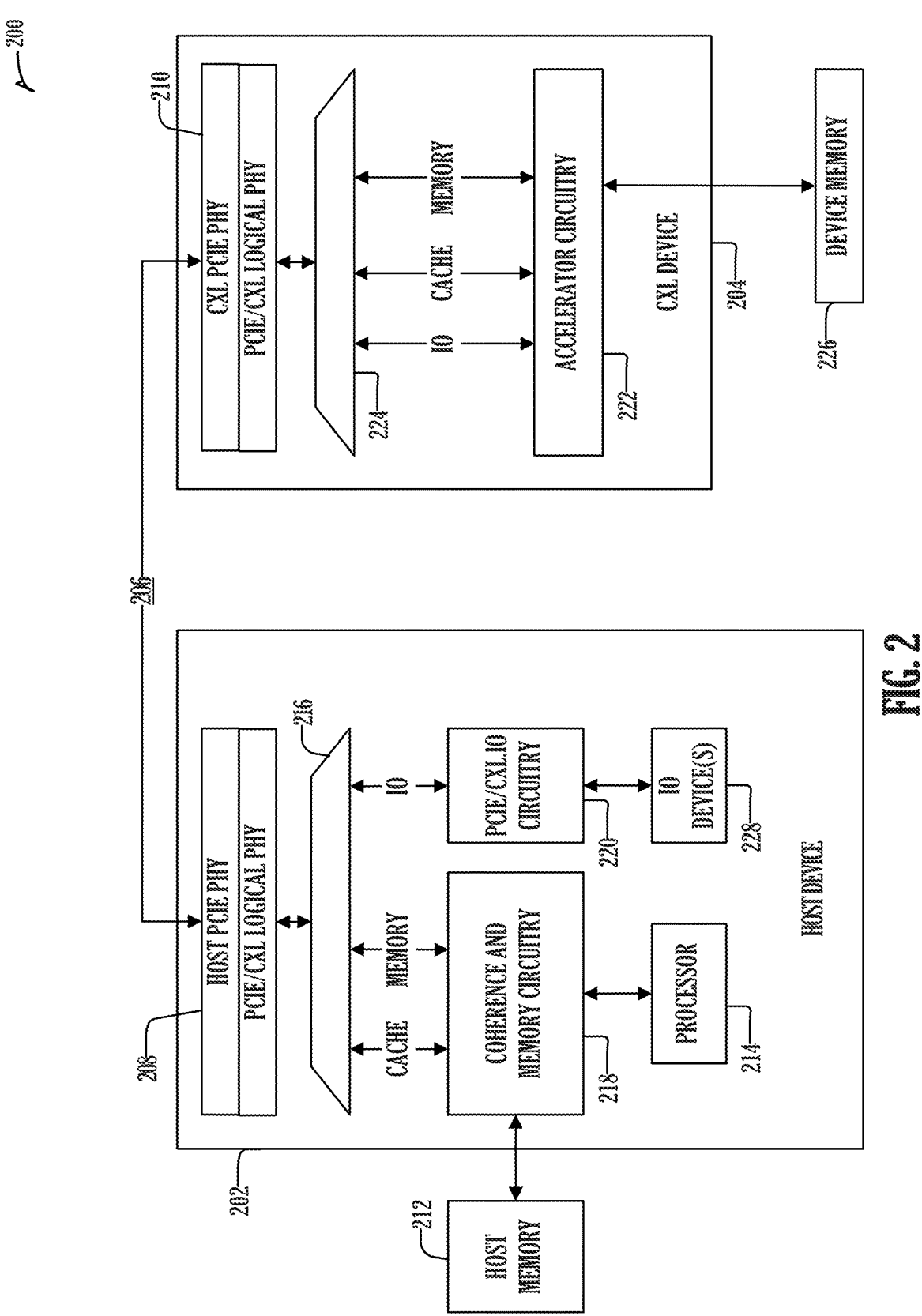
FIG. 2 illustrates an example of a host connected to a CXL device, according to an embodiment.

FIG. 2 illustrates an example of a host connected to a CXL device, according to an embodiment. FIG. 2 illustrates generally an example of a CXL system 200 that uses a CXL link 206 to connect a host device 202 and a CXL device 204 via a host physical layer PCIE interface 208 and a CXL client physical layer PCIE interface 210 respectively. In an example, the host device 202 comprises or corresponds to the host device 105 and the CXL device 204 comprises or corresponds to the memory system 125 from the example of the system in FIG. 1. A memory system command manager can comprise a portion of the host device 202 or the CXL device 204. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL-.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores) and IO device(s) 228. The host device 202 can comprise, or can be coupled to, host memory 212. The host device 202 can include various circuitry (e.g., logic) configured to facilitate CXL-based communications and transactions with the CXL device 204. For example, the host device 202 can include coherence and memory circuitry 218 configured to implement transactions according to CXL- .cache and CXL.mem semantics, and the host device 202 can include PCIe circuitry 220 configured to implement transactions according to CXL.io semantics. In an example, the host device 202 can be configured to manage coherency of data cached at the CXL device 204 using, e.g., its coherence and memory circuitry 218.

The host device 202 can further include a host multiplexer 216 configured to modulate communications over the CXL link 206 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures can use different solutions, which in turn can compromise backward compatibility. CXL can address this problem by consolidating the coherency function at the host device 202, such as using the coherence and memory circuitry 218.

The CXL device 204 can include an accelerator device that comprises various accelerator circuitry 222. In an example, the CXL device 204 can comprise, or can be coupled to, CXL device memory 226. The CXL device 204 can include various circuitry configured to facilitate CXL-based communications and transactions with the host device 202 using the CXL link 206. For example, the accelerator circuitry 222 can be configured to implement transactions according to CXL.cache, CXL.mem, and CXL.io semantics. The CXL device 204 can include a CXL device multiplexer 224 configured to control communications over the CXL link 206. The accelerator circuitry 222 can be one or more processors that can perform one or more tasks. Accelerator circuitry 222 can be a general purpose processor or a processor designed to accelerate one or more specific workloads.

Figure 3:
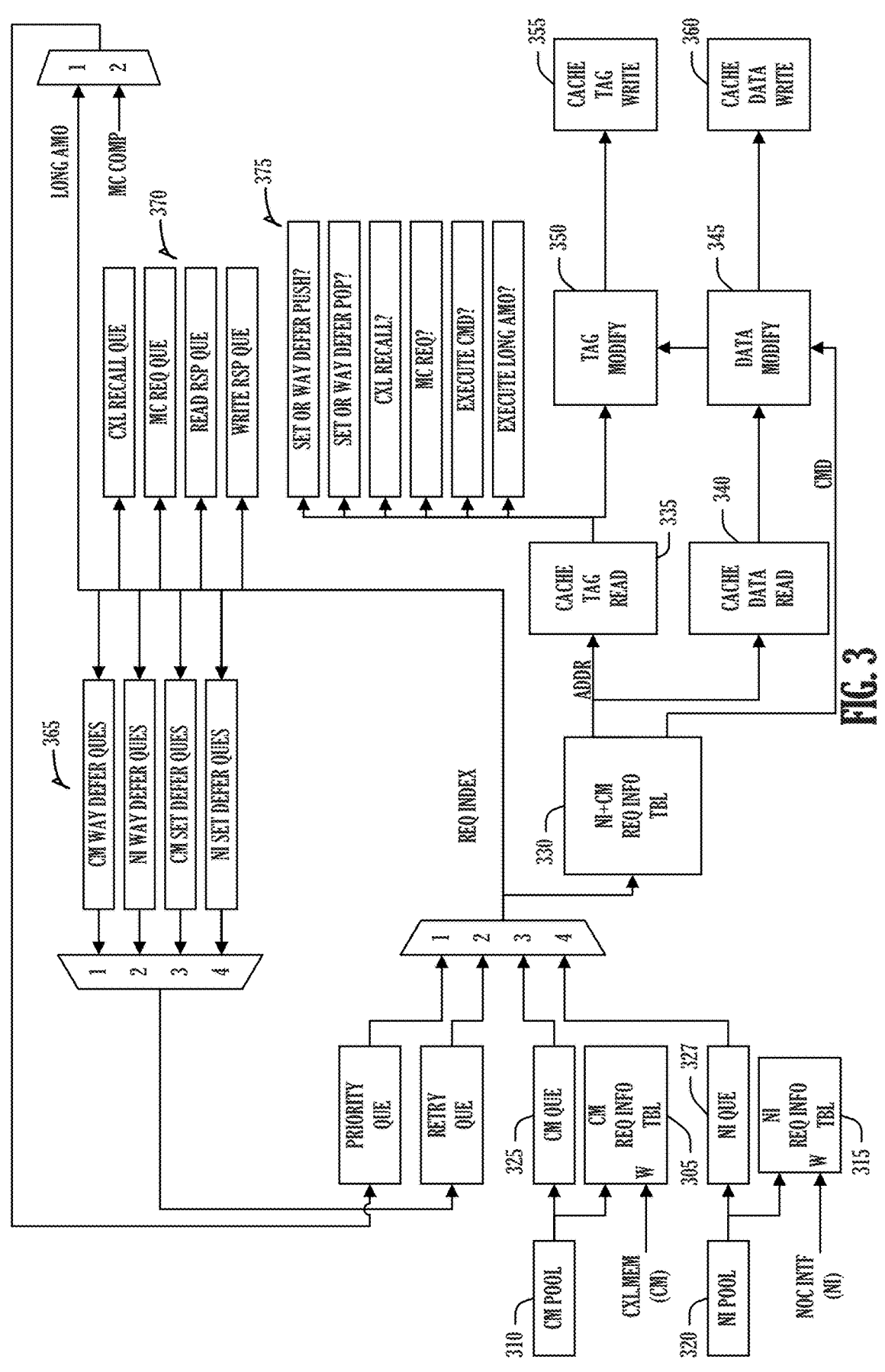
FIG. 3 illustrates example components of a memory device, according to an embodiment.

FIG. 3 illustrates example components of a memory device, according to an embodiment. The illustrated components are part of a memory controller, such as those described above (e.g., the memory controller 130 illustrated in FIG. 1) implementing a memory-side cache (MSC). The illustrated components include elements to address internal (e.g., from a near-memory accelerator) and external (e.g., received from a host via a CXL link) request differences used to maintain CXL protocol requirements, such as maintaining forward progress of CXL memory (CM) requests.

As illustrated, CM refers to CXL memory or other external requests and NI refers to requests coming from a NOC interface or other internal requests. Requests from CXL.mem are written to the CM Request Information Table 305. The entry in the CM Request Information Table 305 to which a request is written is obtained from the CM Request Information Table Pool 310. The CM Request Information Table Pool 310 maintains a list of indices to CM Request Information Table entries that are available (e.g., free, or unused). Requests from an accelerator within the device are written to the NI Request Information Table 315 using the NI Request Information Table Pool 320 for the available entry indices. The two pools—the CM Request Information Table Pool 310 and the NI Request Information Table Pool 320—are configured such that accelerator requests (e.g., internal requests) cannot consume all table entries. Thus, for example, if an additional NI request arrives and there is no free entry indicated in the NI Request Information Table Pool 320, the request fails.

CXL.mem requests from the CM queue 325 are selected at higher priority than NI requests in the NI queue 327 to ensure forward progress of the CM requests. In an example, as illustrated, when a request is selected from either the CM queue 325 or the NI queue 327, the request information is written into the NI+CM Request Information Table 325. Hereafter, each request is represented in the carious queues by an identifier (e.g., index) to an entry of the NI+CM Request Information Table 330. This arrangement can reduce the storage requirements and bandwidth in transferring the request information among the various queues at different processing points in the controller. When an aspect of the request is needed by a processing point, such as an address for a read, the identifier is used to reference the entry in the NI+CM Request Information Table 330 and retrieve the field of the request corresponding to the needed aspect. As with the CM Request Information Table 305 and the NI Request Information Table 315, a free list, or pool, of entries can be used to quickly determine which entries are available to store request information in the NI+CM Request Information Table 330.

When a request is selected, a cache tag 335 for a cache line (e.g., cache way) corresponding to an address in the request is checked to determine whether the requests will be deferred (e.g., processed later). Deferral of the request is generally required when there is no free way line entry in a cache set for the address in the request. If no deferral will occur, the cache data can be read 340 or modified 345 (e.g., for a write), and the way tag can be modified 350. Modifying the tag 350 or the cache data 345 can respectively be written to backing memory, such as in writing the tag data 355 and the cache way data 360.

When the request is deferred, the request the request entry identifier (e.g., from the NI+CM Request Information Table 330) is pushed to either the CM or NI defer queues 365. The way defer queues 365 are used when there is a way corresponding to the address in the request but the way is busy (e.g., waiting for another command to complete). The set defer queues 365 are used when there is no way that corresponds to the address. The request remains queued until a way is available (e.g., not busy). In an example, there are separate CM and NI defer queues 365 for each cache set within the cache.

The external control queues 370 manage external responses to the cache, such as responses to reads or writes to the backing memory, memory controller (MC) requests, or CXL recalls. A CXL recall is a request by the memory device to regain control of a cache way from the host. The recall is requested of the host and the host communicates the control of the cache way to the memory controller, for example, in CXL meta state. This procedure can be called a bias flip as the control bias for the cache way is flipped from the host to the controller or vice versa. This technique is used to enable cache coherency between any host cache and the memory device.

The command queues 375 track requests through a variety of processing points, such as whether to push or pop requests from defer queues 365, whether a CXL recall is initiated, memory controller requests, executing a command, or executing an atomic memory operation (AMO). The reference to a long AMO is an AMO that cannot complete within a single execution cycle (e.g., a clock cycle). An AMO is a near-memory operation completed by an accelerator of the memory controller.

The illustrated control and data paths are configured such that separate storage, queuing, and request prioritization enables forward progress on CM requests while executing in the presence of NI requests. Thus, CM requests will not be delayed by an NI request.

FIG. 4 illustrates an example of an associative cache 400, according to an embodiment. Here, the associative cache 400 includes four cache sets, cache set zero 405, cache set one 410, cache set two 415, and cache set three 420. Note that each cache set corresponds to a memory address range. Thus, cache set one corresponds to all memory elements with an address prefixed by 00 while cache set three 415 corresponds to all memory elements with an address prefixed by 10. The cache lines within each cache set represent a storage element (e.g., register) sized for an element in the memory. Each cache line can also be called a "way." Thus, as illustrated, the associated cache 400 is a four-way associative cache because four ways can be used for each cache set. Generally, memory requests with addresses in one cache set will load a way until all of the ways are used. With the arrival of another memory request, a process to evict a way to load the new data can be undertaken to free the way for the new memory request.

The associative cache 400 can maintain metadata for the ways. Thus, as illustrated, the associative cache 400 includes a tag (e.g., metadata) in addition to the way data, resulting in the way zero tag and data 425, the way one tag and data 430, the way two tag and data 435, and the way three tag and data 440. Examples of tag data can include a dirty bit to indicate whether the way is out-of-sync with the backing memory, whether there is an operation to synchronize the way with host memory (e.g., a host recall is underway), or CXL meta-state, request state, among others. In an example, whether the source (e.g., internal, or external) of the request impacts operation of the memory controller, the tag data can include designation of whether the request is internal or external as well as, for example, whether the request is internal and deferred, or external and deferred.

The following is an example of a data structure (e.g., C-style struct) to hold tag data that applies to an entire cache set (e.g., not specific to a single way in the cache set):

```
struct MscSet {
    bool            m_bRetryPend;
    uint32_t             m_evHashMask;
    SimCount             m_evRecallCnt;
    SimMscReqList        m_niDeferList;
    SimMscReqList        m_cmDeferList;
};
```

The following is an example of a data structure (e.g., C-style struct) to hold tag data for a given way in a cache set:

```
struct MscWay {
    struct MscWayTag {
        uint64_t          m_addr;
        std::bitset       m_validMask;
        std::bitset       m_dirtyMask;
        std::bitset       m_mBusyMask;
        bool              m_bRetryPend;
        bool              m_bRecallPend;
        uint16_t          m_recallRid;
        MetaState         m_memMetaState;
        MetaState         m_curMetaState;
        SimMscReqList      m_niDeferList;
        SimMscReqList      m_cmDeferList;
    } m_tag;
    uint8_t[64]     m_data;
```

-continued
```
};
```

FIG. 5 illustrates an example of cache meta state transformation without writeback, according to an embodiment. As illustrated, the data structure 525 includes a cache set 530 with several ways. The ways include the tag data and data as illustrated in FIG. 4. In addition, each way includes an additional memory element (e.g., register, place in state memory, etc.) to hold the initial metadata state of the way. In an example, the memory element is another field in the tag data. Thus, way zero has memory element 535 to hold the original meta state when way zero was first written (e.g., after initialization). Similarly, separate memory element 540 tracks the original meta state for way one and memory element 545 holds the original meta state for the nth way.

In an example, the cache tag for each memory line contains two bits for the meta state value in memory (e.g., memory elements 535-545) and two bits for the current meta state value. When a cache line is evicted, the current meta state and memory meta state values are compared to determine if the meta state in memory needs to be written. Generally, the meta state needs to be written when the current meta state and the memory meta state are not the same. Sameness here, can be on a subset of meta state fields dependent upon configuration. Thus, the two values need not be bitwise identical, but rather values of a designated (e.g., predefined) set of meta state fields that are equivalent result in a determination that the current and memory meta states are the same.

The following example illustrates a situation in which tracking the original meta state and comparing it with a current meta state can be useful. Consider a host that uses a CXL.mem to read a memory line from the CXL device. The memory side cache does not have the requested line cached, so the line is read from memory and placed in the cache with, for example, a memory meta state marked invalid. The CXL.mem read indicates the line is being requested for a write operation and marks the current meta state as "host accessed for write operation." Then, a device accelerator on the CXL memory device—such as an AMU—issues a read access to the line causing the line to be recalled from the host. Here, the recall is a request by the memory device for the host to relinquish control of the line to the memory device. This is also called a bias flip.

The host returns the line indicating it was not written—data is not modified in the cache—and the current meta state is set to invalid, due to the recall, by the host. The accelerator read operation is completed returning the data that was read in the response. At this point a different address is accessed in the cache causing the previous memory line to be evicted. Here, the eviction is a silent eviction—there is no need to write data or meta state back to memory—because the memory meta state is marked as invalid, and the current meta state is also marked as invalid. Thus, the writeback to the memory is avoided.

The flow 550 provides a more generic representation of the above scenario. Meta state is written to the cache line tag (operation 555) and separately to the memory element (e.g., memory element 535) to track the original meta state (operation 560). Some operation causes an update to the meta state to be received (operation 565) and written (operation 570) to the current meta state. Another update to the meta state is received (operation 575) and written (operation 580) to the current meta state. When the way is being evicted, the original meta state, written in operation 560, is compared to the current meta state (operation 585). If they are the same, then the writeback to memory is not needed because of the meta state (operation 590). In the illustrated example, the meta state received at operation 575 matched the original meta state written at operation 560.

Figure 6:
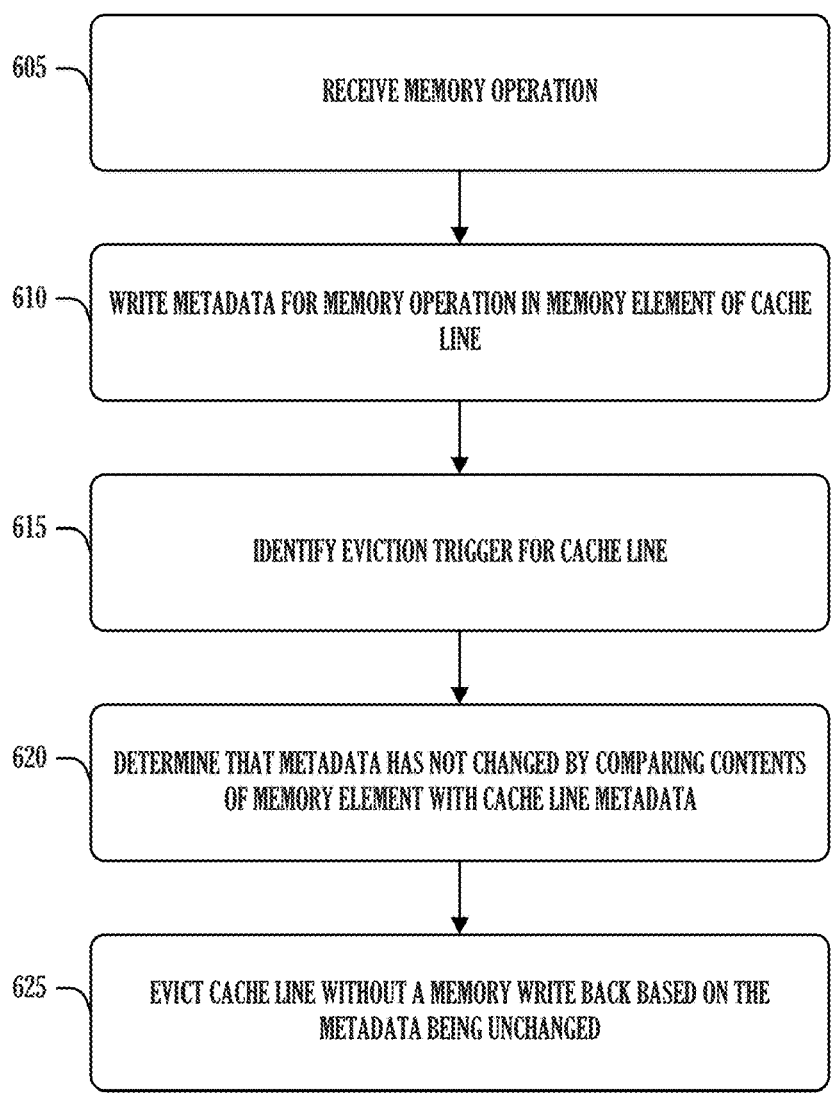
FIG. 6 illustrates a flow diagram of an example of a method for silent cache line eviction, according to an embodiment.

FIG. 6 illustrates a flow diagram of an example of a method 600 for silent cache line eviction, according to an embodiment. The operations of the method 600 are performed by computational hardware, such as that described above or below (e.g., processing circuitry).

At operation 605, a memory operation is received from a host at a memory device. In an example, the memory operation establishes (e.g., includes, defines, indicates, etc.) data and metadata in a cache line (e.g., way) of the memory device. In an example, the metadata is connection metadata of an interface between the host and the memory device. In an example, the interface is a Compute Express Link (CXL) interlink. In an example, the metadata is CXL meta-state.

In an example, a dirty flag is maintained for the data in the cache line. Here, the dirty flag is set in response to a change in data in the cache line.

At operation 610, the metadata is stored in a memory element that corresponds to the cache line. In an example, the metadata is stored in a tag-store for the cache line. In an example, the memory element is a register dedicated to the cache line.

At operation 615, an eviction trigger to evict the cache line is identified.

At operation 620, in response to the eviction trigger, current metadata of the cache line is compared with the metadata in the memory element to determine whether the metadata has changed. In an example, comparing the current metadata of the cache line with the metadata in the memory element includes determining a state of the dirty flag.

In an example, the method 700 can include the operation of receiving multiple updates to the metadata in the cache line between receipt of the memory operation and the eviction trigger.

At operation 625, the cache line is evicted without writing to backing memory in response to the metadata being unchanged based on the comparison in operation 620. In an example, the cache line is evicted without writing to the backing memory in response to the dirty flag being unset.

The method 700 can include additional operations to address a changed meta state that results in a writeback to the backing memory. For example, a second memory operation of the host can be received that establishes second data and second metadata in a second cache line of the memory device. The second metadata can be stored in a second memory element that corresponds to the second cache line. When a second eviction trigger to evict the second cache line is identified, second current metadata of the second cache line can be compared to the second memory element to determine whether the second metadata has changed. Then the second data and the second metadata can be written to the backing memory in response to the second metadata being changed.

Figure 7:
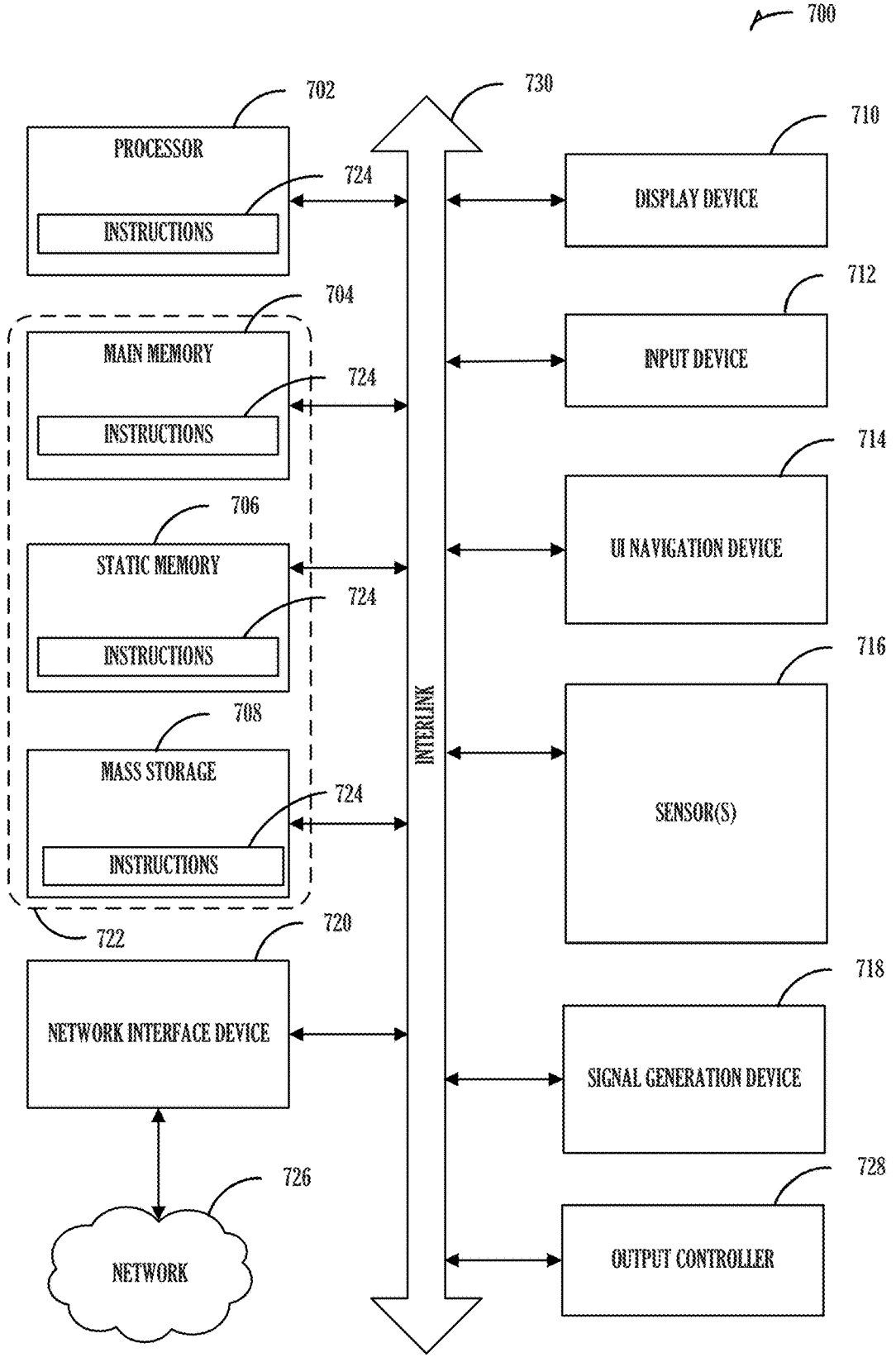
FIG. 7 illustrates an example of a machine with which one or more embodiments can be implemented.

FIG. 7 illustrates a block diagram of an example machine 700 with which any one or more of the techniques (e.g., methodologies) discussed herein can perform. Examples, as described herein, can include, or can operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 can include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which can communicate with each other via an interlink (e.g., bus) 730. The machine 700 can further include a display unit 710, an alphanumeric input device 712 (e.g., a keyboard), and a user interface (UI) navigation device 714 (e.g., a mouse). In an example, the display unit 710, input device 712 and UI navigation device 714 can be a touch screen display. The machine 700 can additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 can be, or include, a machine readable medium 722 on which is stored one or more sets of data structures or instructions 724 (e.g., software) embodying or utilized by any one or more of the techniques or functions described herein. The instructions 724 can also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 can constitute the machine readable media 722. While the machine readable medium 722 is illustrated as a single medium, the term "machine readable medium" can include a single medium or multiple media (e.g., a centralized or distributed database, or associated caches and servers) configured to store the one or more instructions 724.

The term "machine readable medium" can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 can be representative of the instructions 724, such as instructions 724 themselves or a format from which the instructions 724 can be derived. This format from which the instructions 724 can be derived can include source code, encoded instructions (e.g., in compressed or encrypted form), packaged instructions (e.g., split into multiple packages), or the like. The information representative of the instructions 724 in the machine readable medium 722 can be processed by processing circuitry into the instructions to implement any of the operations discussed herein. For example, deriving the instructions 724 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 can include assembly, compilation, or interpretation of the information (e.g., by the processing circuitry) to create the instructions 724 from some intermediate or preprocessed format provided by the machine readable medium 722. The information, when provided in multiple parts, can be combined, unpacked, and modified to create the instructions 724. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 can be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is an apparatus for silent cache line eviction, the apparatus comprising: an interface configured to receive a memory operation from an external entity; a cache including a cache line; and processing circuitry configured to: receive a memory operation via the interface, the memory operation establishing data and metadata in the cache line; store the metadata in a memory element that corresponds to the cache line; identify an eviction trigger to evict the cache line; compare, in response to the eviction trigger, current metadata of the cache line with the metadata in the memory element to determine whether the metadata has changed; and evict the cache line without writing to backing memory in response to the metadata being unchanged.

In Example 2, the subject matter of Example 1, wherein the metadata is connection metadata of an interface between the host and the memory device.

In Example 3, the subject matter of Example 2, wherein the interface is a Compute Express Link (CXL) interlink.

In Example 4, the subject matter of Example 3, wherein the metadata is CXL meta-state.

In Example 5, the subject matter of any of Examples 1-4, wherein a dirty flag is maintained for the data in the cache line, and wherein the dirty flag is set in response to a change in data in the cache line.

In Example 6, the subject matter of Example 5, wherein, to compare the current metadata of the cache line with the metadata in the memory element, the processing circuitry is configured to determine a state of the dirty flag, and wherein the cache line is evicted without writing to the backing memory is performed in response to the dirty flag being unset.

In Example 7, the subject matter of any of Examples 1-6, wherein the processing circuitry is configured to receive multiple updates to the metadata in the cache line between receipt of the memory operation and the eviction trigger.

In Example 8, the subject matter of any of Examples 1-7, wherein the processing circuitry is configured to: receive a second memory operation of the host via the interface, the second memory operation establishing second data and second metadata in a second cache line of the memory device; store the second metadata in a second memory element that corresponds to the second cache line; identify a second eviction trigger to evict the second cache line; compare, in response to the second eviction trigger, second current metadata of the second cache line and the second memory element to determine whether the second metadata has changed; and write the second data and the second metadata to the backing memory in response to the second metadata being changed.

In Example 9, the subject matter of any of Examples 1-8, wherein the metadata is stored in a tag-store for the cache line.

In Example 10, the subject matter of any of Examples 1-9, wherein the memory element is a register dedicated to the cache line.

Example 11 is a method for silent cache line eviction, the method comprising: receiving, at a memory device, a memory operation from a host, the memory operation establishing data and metadata in a cache line of the memory device; storing the metadata in a memory element that corresponds to the cache line; identifying an eviction trigger to evict the cache line; comparing, in response to the eviction trigger, current metadata of the cache line with the metadata in the memory element to determine whether the metadata has changed; and evicting the cache line without writing to backing memory in response to the metadata being unchanged.

In Example 12, the subject matter of Example 11, wherein the metadata is connection metadata of an interface between the host and the memory device.

In Example 13, the subject matter of Example 12, wherein the interface is a Compute Express Link (CXL) interlink.

In Example 14, the subject matter of Example 13, wherein the metadata is CXL meta-state.

In Example 15, the subject matter of any of Examples 11-14, wherein a dirty flag is maintained for the data in the cache line, and wherein the dirty flag is set in response to a change in data in the cache line.

In Example 16, the subject matter of Example 15, wherein comparing the current metadata of the cache line with the metadata in the memory element includes determining a state of the dirty flag, and wherein evicting the cache line without writing to the backing memory is performed in response to the dirty flag being unset.

In Example 17, the subject matter of any of Examples 11-16, comprising receiving multiple updates to the meta-data in the cache line between receipt of the memory operation and the eviction trigger.

In Example 18, the subject matter of any of Examples 11-17, comprising: receiving a second memory operation of the host, the second memory operation establishing second data and second metadata in a second cache line of the memory device; storing the second metadata in a second memory element that corresponds to the second cache line; identifying a second eviction trigger to evict the second cache line; comparing, in response to the second eviction trigger, second current metadata of the second cache line and the second memory element to determine whether the second metadata has changed; and writing the second data and the second metadata to the backing memory in response to the second metadata being changed.

In Example 19, the subject matter of any of Examples 11-18, wherein the metadata is stored in a tag-store for the cache line.

In Example 20, the subject matter of any of Examples 11-19, wherein the memory element is a register dedicated to the cache line.

Example 21 is a machine readable medium including instructions for silent cache line eviction, the instructions, when executed by processing circuitry, cause the processing circuitry to perform operations comprising: receiving, at a memory device, a memory operation from a host, the memory operation establishing data and metadata in a cache line of the memory device; storing the metadata in a memory element that corresponds to the cache line; identifying an eviction trigger to evict the cache line; comparing, in response to the eviction trigger, current metadata of the cache line with the metadata in the memory element to determine whether the metadata has changed; and evicting the cache line without writing to backing memory in response to the metadata being unchanged.

In Example 22, the subject matter of Example 21, wherein the metadata is connection metadata of an interface between the host and the memory device.

In Example 23, the subject matter of Example 22, wherein the interface is a Compute Express Link (CXL) interlink.

In Example 24, the subject matter of Example 23, wherein the metadata is CXL meta-state.

In Example 25, the subject matter of any of Examples 21-24, wherein a dirty flag is maintained for the data in the cache line, and wherein the dirty flag is set in response to a change in data in the cache line.

In Example 26, the subject matter of Example 25, wherein comparing the current metadata of the cache line with the metadata in the memory element includes determining a state of the dirty flag, and wherein evicting the cache line without writing to the backing memory is performed in response to the dirty flag being unset.

In Example 27, the subject matter of any of Examples 21-26, wherein the operations comprise receiving multiple updates to the metadata in the cache line between receipt of the memory operation and the eviction trigger.

In Example 28, the subject matter of any of Examples 21-27, wherein the operations comprise: receiving a second memory operation of the host, the second memory operation establishing second data and second metadata in a second cache line of the memory device; storing the second metadata in a second memory element that corresponds to the second cache line; identifying a second eviction trigger to evict the second cache line; comparing, in response to the second eviction trigger, second current metadata of the second cache line and the second memory element to determine whether the second metadata has changed; and writing the second data and the second metadata to the backing memory in response to the second metadata being changed.

In Example 29, the subject matter of any of Examples 21-28, wherein the metadata is stored in a tag-store for the cache line.

In Example 30, the subject matter of any of Examples 21-29, wherein the memory element is a register dedicated to the cache line.

Example 31 is a system for silent cache line eviction, the system comprising: means for receiving, at a memory device, a memory operation from a host, the memory operation establishing data and metadata in a cache line of the memory device; means for storing the metadata in a memory element that corresponds to the cache line; means for identifying an eviction trigger to evict the cache line; means for comparing, in response to the eviction trigger, current metadata of the cache line with the metadata in the memory element to determine whether the metadata has changed; and means for evicting the cache line without writing to backing memory in response to the metadata being unchanged.

In Example 32, the subject matter of Example 31, wherein the metadata is connection metadata of an interface between the host and the memory device.

In Example 33, the subject matter of Example 32, wherein the interface is a Compute Express Link (CXL) interlink.

In Example 34, the subject matter of Example 33, wherein the metadata is CXL meta-state.

In Example 35, the subject matter of any of Examples 31-34, wherein a dirty flag is maintained for the data in the cache line, and wherein the dirty flag is set in response to a change in data in the cache line.

In Example 36, the subject matter of Example 35, wherein the means for comparing the current metadata of the cache line with the metadata in the memory element include means for determining a state of the dirty flag, and wherein the cache line is evicted without writing to the backing memory is performed in response to the dirty flag being unset.

In Example 37, the subject matter of any of Examples 31-36, comprising means for receiving multiple updates to the metadata in the cache line between receipt of the memory operation and the eviction trigger.

In Example 38, the subject matter of any of Examples 31-37, comprising: means for receiving a second memory operation of the host, the second memory operation establishing second data and second metadata in a second cache line of the memory device; means for storing the second metadata in a second memory element that corresponds to the second cache line; means for identifying a second eviction trigger to evict the second cache line; means for comparing, in response to the second eviction trigger, second current metadata of the second cache line and the second memory element to determine whether the second metadata has changed; and means for writing the second data and the second metadata to the backing memory in response to the second metadata being changed.

In Example 39, the subject matter of any of Examples 31-38, wherein the metadata is stored in a tag-store for the cache line.

In Example 40, the subject matter of any of Examples 31-39, wherein the memory element is a register dedicated to the cache line.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

Example ?? is at least one machine-readable storage medium comprising information representative of instructions that, when executed by processing circuitry, cause the processing circuitry to perform the operations of any of Examples 1-??.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to enable the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A cache device comprising:

a first interface configured to receive a memory operation;

a second interface configured to communicate with a memory device;

a storage device with a portion configured as a cache line; and processing circuitry configured to:

track metadata changes for the cache line between writebacks to the memory device by:

recording first cache line metadata when metadata is originally written to the cache line separately from current cache line metadata; and comparing the current cache line metadata to the first cache line metadata based on an eviction event to produce an indicator whether there is a difference between the first cache line metadata and the current cache line metadata; and writeback the metadata to the memory device as part of an eviction of the cache line only when the indicator of whether there is a difference between the first cache line metadata and the current cache line metadata indicates that there is a difference or a dirty flag is present on the cache line.

2. The cache device of claim 1, wherein the processing circuitry is configured to process multiple updates to the metadata of the cache line between recording the first cache line metadata and the eviction event.

3. The cache device of claim 1, wherein the storage device includes a second portion configured as a second cache line for the memory device; and wherein the processing circuitry is configured to:

receive a second memory operation on the first interface, the second memory operation establishing second data and second metadata in the second cache line;

store the second metadata as initial cache line metadata for the second cache line;

identify a second eviction trigger to evict the second cache line;

compare, in response to the second eviction trigger, current metadata of the second cache line and the initial cache line metadata for the second cache line to detect that there is a difference; and write the second data and the second metadata to the memory device, using the second interface, in response to the difference.

4. The cache device of claim 1, wherein the first interface is communicatively coupled to a host device when in operation.

5. The cache device of claim 4, wherein the metadata is connection metadata of the first interface between the host device and the memory device.

6. The cache device of claim 5, wherein the first interface conforms to a Compute Express Link (CXL) interlink family of standards.

7. The cache device of claim 6, wherein the metadata is CXL meta-state.

8. The cache device of claim 1, wherein the dirty flag is maintained for data in the cache line, and wherein the dirty flag is set in response to a change in the data in the cache line.

9. The cache device of claim 1, wherein the portion of the storage device includes a tag-store to hold the metadata.

10. The cache device of claim 1, wherein the cache device includes a register dedicated to the cache line and configured to store the first cache line metadata.

11. A method comprising:

receiving, at a first interface of a cache device, a memory operation;

tracking, by a cache device, changes to metadata for a cache line of a memory device connected to the cache device by a second interface, including:

recording first cache line metadata when metadata is originally written to the cache line separately from current cache line metadata; and comparing the current cache line metadata to the first cache line metadata based on an eviction event to produce an indicator whether there is a difference between the first cache line metadata and the current cache line metadata; and writing back the metadata to the memory device as part of an eviction of the cache line only when the indicator of whether there is a difference between the first cache line metadata and the current cache line metadata indicates that there is a difference or a dirty flag is present on the cache line.

12. The method of claim 11, wherein multiple updates to the metadata of the cache line are processed between recording the first cache line metadata and the eviction event.

13. The method of claim 11, comprising:

receiving a second memory operation on the first interface, the second memory operation establishing second data and second metadata in a second cache line;

storing the second metadata as initial cache line metadata for the second cache line;

identifying a second eviction trigger to evict the second cache line;

comparing, in response to the second eviction trigger, current metadata of the second cache line and the initial cache line metadata for the second cache line to detect that there is a difference; and writing the second data and the second metadata to the memory device, using the second interface, in response to the difference.

14. The method of claim 11, wherein the first interface is communicatively coupled to a host device when the cache device is in operation.

15. The method of claim 14, wherein the metadata is connection metadata of the first interface between the host device and the memory device.

16. The method of claim 15, wherein the first interface conforms to a Compute Express Link (CXL) interlink family of standards.

17. The method of claim 16, wherein the metadata is CXL meta-state.

18. The method of claim 11, wherein the dirty flag is maintained for data in the cache line, and wherein the dirty flag is set in response to a change in the data in the cache line.

19. The method of claim 11, wherein the cache line includes a tag-store to hold the metadata.

20. The method of claim 11, wherein the cache device includes a register dedicated to the cache line and configured to store the first cache line metadata.

* * * * *